United States Patent
Yasuda

(10) Patent No.: US 7,597,329 B2
(45) Date of Patent: Oct. 6, 2009

(54) METAL LAMINATED TYPE OF CYLINDER HEAD GASKET WITH ASYMMETRICAL BEAD

(75) Inventor: Kishou Yasuda, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 12/003,980

(22) Filed: Jan. 4, 2008

(65) Prior Publication Data
US 2008/0164660 A1   Jul. 10, 2008

(30) Foreign Application Priority Data
Jan. 9, 2007   (JP)   ............... 2007-001173

(51) Int. Cl.
*F02F 11/00*   (2006.01)
(52) U.S. Cl. .................. 277/595; 277/593; 277/594
(58) Field of Classification Search ............ 277/593, 277/594, 595
See application file for complete search history.

(56) References Cited

U.S. PATENT DOCUMENTS 6,206,381 B1 * 3/2001 Ii et al. .................. 277/593

6,315,303 B1 * 11/2001 Erb et al. .................. 277/593

FOREIGN PATENT DOCUMENTS

| DE | 197 31 493 A1 | 2/1999 |
| DE | 198 08 373 C2 | 7/1999 |
| DE | 103 24 667 A1 | 12/2004 |
| DE | 10 2005 006 204 A1 | 8/2006 |
| EP | 0 658 855 B1 | 3/1990 |
| EP | 1 184 608 | 3/2002 |
| GB | 2 121 123 A | 12/1983 |
| JP | 08291864 A * | 11/1996 |
| WO | WO 91/15690 | 10/1991 |

* cited by examiner

*Primary Examiner*—Jennifer H Gay
*Assistant Examiner*—Ashley Watkins-Butler
(74) *Attorney, Agent, or Firm*—Manabu Kanesaka

(57) ABSTRACT

A metal laminate cylinder head gasket includes first and second metal plates laminated together. The first metal plate has a combustion hole, and an asymmetrical bead formed around the combustion hole. The asymmetrical bead has a large radius portion with a width (a) at a side of the combustion hole from a top of the bead, a small radius portion with a width (b) at the other side from the top of the bead, and a smallest radius (R). The second metal plate is laminated at a projecting side of the asymmetrical bead. A relationship between (a) and (b) is (a)>(b), the smallest radius (R) is (R)≧0.5 mm, and a relationship between the width (a) and the radius (R) is (a)≧2(R).

2 Claims, 2 Drawing Sheets

METAL LAMINATED TYPE OF CYLINDER HEAD GASKET WITH ASYMMETRICAL BEAD

BACKGROUND OF THE INVENTION AND RELATED ART STATEMENT

The present invention relates to a metal laminate type cylinder head gasket sandwiched between a cylinder block and a cylinder head of an engine. More specifically, the invention relates to a metal laminate type cylinder head gasket with asymmetrical bead which balances surface pressures generated on both bottom portions of a seal bead provided around a combustion chamber hole, and prevents a dent or impression due to the surface pressures from being generated on the cylinder block and cylinder head.

With accompanying higher technologies of an engine, effort has been made for enhancing a sealing capability between the cylinder block and cylinder head. For example, in the metal laminate type gasket disclosed in Patent Document 1, as shown in FIG. 4, an asymmetrical bead 35a is formed around a combustion chamber hole 31 in a base plate 35 on a cross-section passing through a combustion chamber hole 31, a tightening bolt hole 32, and a cooling water hole 33 formed in a gasket 30. A secondary plate 36 is laminated at a projecting portion side of the asymmetrical bead 35a in the base plate 35, and is folded back at the hole edge of the combustion chamber hole 31 to extend thereof to a halfway of a concave portion of the asymmetrical bead 35a for forming a wedge stopper 36a. Therefore, the metal laminate type gasket is structured in such a way that the asymmetrical bead 35a crosses over the wedge stopper 36a (increased thickness portion) and the other general portions (non-increased thickness portions).

As described above, it has been known to use the asymmetrical bead 35a having different surface pressures generated on both bottom portions of the bead. In the well-known gasket shown in FIG. 4, an inner bottom portion 35b of the asymmetrical bead is located inside the wedge stopper 36a (increased thickness portion). An outer bottom portion 35c is located at the general portion (non-increased thickness portion) other than the wedge stopper 36a. Thus, according to the asymmetrical bead 35a, even if the bead at a side of the increased thickness portion has a large radius of curvature and a small spring constant, and the bead at a side of the non-increased thickness portion has a small radius of curvature and a large spring constant, the surface pressure of the bead bottom portion at the side of the increased thickness portion becomes large due to the thickness thereof. As described in Patent Document 1, although a sealing capability can be enhanced, it is not considered to balance the surface pressures at the both bottom portions of the seal bead around the combustion chamber hole.

Patent Document 1: Japanese patent Publication No. H04-219572

A technical object of the present invention is that, in the above described asymmetrical bead, by utilizing a difference generated in the surface pressures at the both bottom portions of the bead, in relation to a folded portion of a metal plate around an edge of the combustion chamber hole, the surface pressures generated on the both bottom portions of the seal bead are balanced around the combustion chamber hole of the metal laminate type cylinder head gasket. Thus, a stable sealing capability can be obtained and it is possible to prevent an impression or dent due to a large surface pressure which is partially applied to the cylinder block and the cylinder head from being formed.

Further objects and advantages of the invention will be apparent from the following description of the invention.

SUMMARY OF THE INVENTION

In order to achieve the object described above, according to the present invention, a metal laminate type cylinder head gasket is formed by laminating at least a plurality of metal plates, wherein an asymmetrical bead is formed around a combustion chamber hole in a first metal plate placed in an outermost layer among the plurality of metal plates, and another metal plate is laminated at a projecting portion side of the asymmetrical bead. The above another metal plate is folded back to form a folded portion, an end of the folded portion extending to an outer bottom portion of the asymmetrical bead. The asymmetrical bead in the first metal plate has bead portions including a width a having a large radius of curvature at a side of the combustion chamber hole from the top of the bead and a width b having a small radius of curvature at the other side from the top of the bead. The relationship between a and b is a>b, the smallest radius of curvature R of the bead is $R \geqq 0.5$ mm, and the relationship between the width a and the radius of curvature R of the bead is $a \geqq 2R$.

According to the cylinder head gasket of the present invention having the above structure, as shown in the result of the experiment (simulation) in the surface pressure at compression described later, the surface pressures generated on the both bottom portions of the asymmetrical bead provided around the combustion chamber hole are balanced, thereby obtaining a stable sealing capability.

In a preferable embodiment of the metal laminate type cylinder head gasket according to the present invention, the asymmetrical bead may be provided in only a portion around the combustion chamber hole where the surface pressure generated on the both bottom portions of the bead needs to be balanced, and smoothly connected to a bead provided in the other portion.

Also, in another preferable embodiment of the metal laminate type cylinder head gasket according to the present invention, a metal plate laminated at a projecting portion side of the asymmetrical bead in the first metal plate comprises second and third metal plates. A hole edge portion at a side of the combustion chamber hole in the first metal plate is not fixed to the other metal plates. The second metal plate is folded back at the hole edge of the combustion chamber hole toward a side of the third metal plate, and the end of the folded portion is extended to a position corresponding to an outer bottom portion of the asymmetrical bead in the first metal plate. The edge portion of the third metal plate is located outside the end of the folded portion.

According to the cylinder head gasket of the present invention described above, in the asymmetrical bead, by utilizing a difference in surface pressures at the both bottom portions of the bead, in relation to the folded portion of the metal plate around the combustion chamber hole, the surface pressures generated on the both bottom portions of the seal bead is balanced around the combustion chamber hole of the metal laminate type cylinder head gasket. Thus, a stable sealing capability can be obtained and it is possible to prevent an impression or dent due to a large surface pressure which is partially applied to the cylinder block and the cylinder head from being formed.

DETAILED DESCRIPTION OF THE EMBODIMENTS

Figure 1:
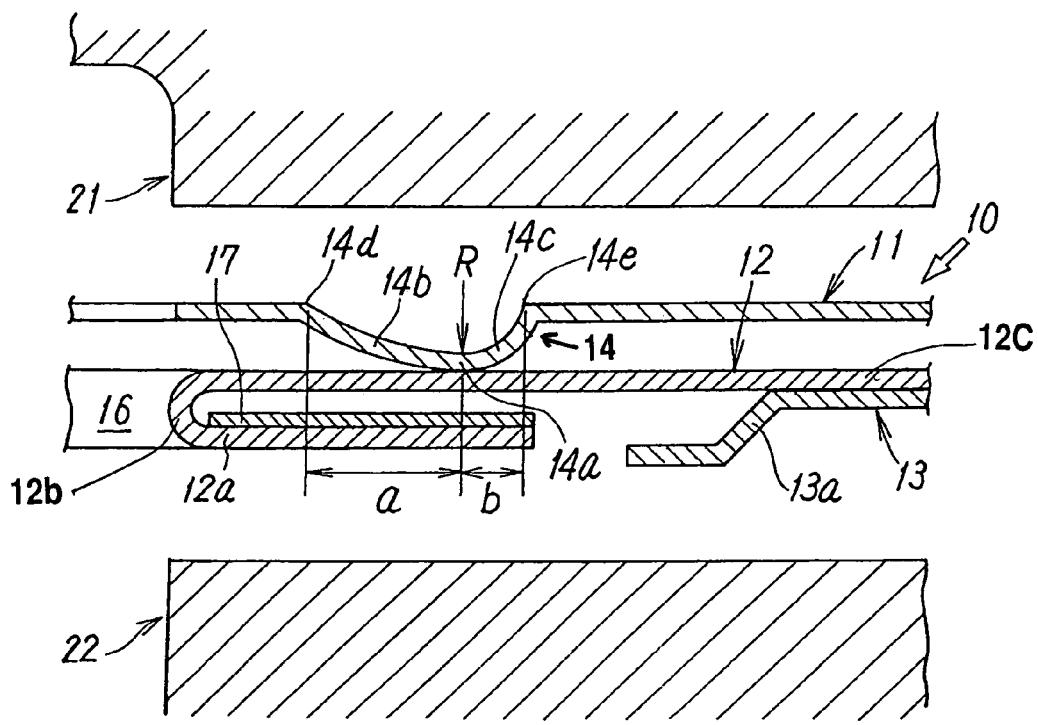
FIG. 1 is a longitudinal sectional view of an enlarged substantial part of a metal laminate type cylinder head gasket according to the present invention showing a state before attaching the metal laminate type cylinder head gasket to an engine.

FIG. 1 shows a substantial part of a metal laminate type cylinder head gasket according to the present invention in an embodiment, i.e. a cross sectional view of a portion around a combustion chamber hole 16. A cylinder head gasket 10 is sandwiched between a cylinder head 21 and a cylinder block 22 of an engine, and formed by laminating at least a plurality of metal plates. In this embodiment, the metal laminate type cylinder head gasket is formed of a first metal plate 11 located in an outermost portion, a second metal plate 12 and a third metal plate 13 laminated on the first metal plate.

An asymmetrical bead 14 is formed around the combustion chamber hole 16 in the first metal plate 11. It is required in such a way that the asymmetrical bead 14 has a width a of a bead portion 14b having a large radius of curvature at a side of the combustion chamber hole 16 from the top 14a of the bead and a width b of the bead portion 14c having a small radius of curvature at the other side from the top 14a of the bead. The relationship between a and b is a>b. Furthermore, the smallest radius of curvature R of the bead is R≧0.5 mm, and the relationship between the width a and the radius of curvature R of the bead is a≧2R. These forming conditions with respect to the asymmetrical bead 14 are obtained from trial-and-error results by the inventor. In addition, a possibility of cracking becomes high when the radius of curvature R is smaller than 0.5 mm.

With the structure described above, as shown in the result of the experiment (simulation) in the surface pressure described later at compression, the surface pressures generated on both bottom portions 14d and 14e inside and outside the asymmetrical bead 14 are balanced, thereby obtaining a stable sealing capability.

With respect to the bead portions 14b and 14c at the both sides of the top 14a of the bead, although a relative magnitude relation of the radii of curvature is explained, it is not necessarily imply that the radii of curvature are fixed within a range of the respective bead portions 14b and 14c. The average magnitude relation of the radii of curvature within the both ranges is explained. Therefore, the asymmetrical bead 14 may be formed to be curved gradually from one end to the other end thereof.

In addition, if it is possible to obtain a space for placing the asymmetrical bead 14, the asymmetrical bead 14 may be entirely provided around the combustion chamber hole 16, or in only a portion where the surface pressures generated on the both bottom portions 14d and 14e of the bead 14 needs to be balanced, for example a portion around a fastening bolt for connecting the cylinder head and the cylinder block.

Figure 5:
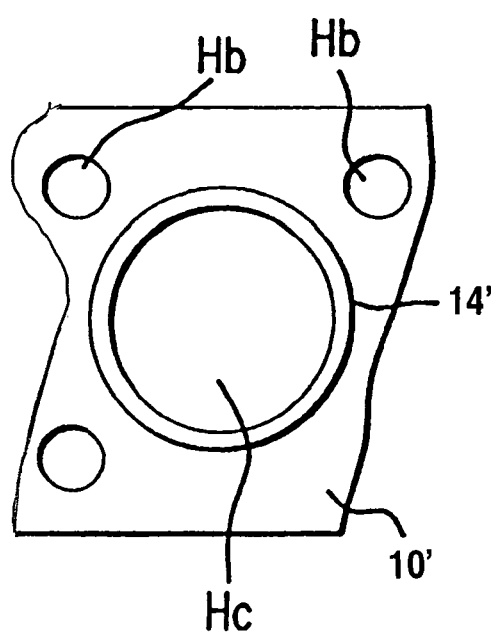
FIG. 5 is a partial plan view showing a gasket with a bead, where the asymmetrical bead of the present invention is partially formed.

In particular, as shown in FIG. 5, a metal plate 10' has a cylinder bore Hc, bolt holes Hb and a regular symmetrical bead 14'. In this gasket, parts of the regular symmetrical bead 14' facing the bolts are changed to the asymmetrical beads 14, according to the invention. In this case, it is necessary to smoothly connect the asymmetrical beads 14 with the regular symmetrical bead around the combustion chamber hole 16.

In the embodiment as shown in FIG. 1, the second and third metal plates 12 and 13 are laminated at the projecting portion side of the asymmetrical bead 14 in the first metal plate 11.

The second metal plate 12 laminated on the first metal plate 11 sandwiches a ring-shaped shim 17 for adjusting a thickness and a bump, and is folded back at a bent portion 12b around the hole edge of the combustion chamber hole 16 toward the side of the third metal plate 13, i.e. the other side of the first metal plate 11. Namely, the second metal plate 12 includes a base portion 12c, the bent portion 12b, and the folded portion 12a. The end of the folded portion 12a is extended to a position corresponding to the outer bottom portion 14e of the asymmetrical bead 14 in the first metal plate 11. Also, the third metal plate 13 is provided with a bead 13a in the edge portion thereof at the side of the combustion chamber hole 16. The edge portion is located outside the end portion of the folded portion 12a in the second metal plate 12 not to overlap with the folded portion 12a.

Accordingly, the first metal plate 11 is not fixed at the hole edge portion at the side of the combustion chamber hole 16 to the second and third metal plates 12 and 13 laminated at the projecting portion side of the asymmetrical bead 14.

When the gasket 10 having the above structure is sandwiched between the cylinder head 21 and the cylinder block 22 and tightened with tightening bolts, the asymmetrical bead 14 is compressed and deformed around the combustion chamber hole 16. Therefore, a relatively large surface pressure is generated on the bottom portions 14d and 14e of the asymmetrical bead 14 with accompanying the compressive deformation.

Figure 2:
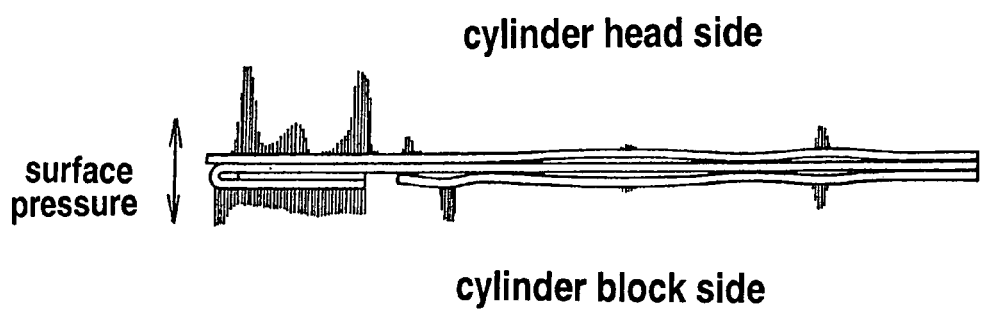
FIG. 2 is a graph showing a result of an experiment (simulation) in a surface pressure distribution generated in a case that the cylinder head gasket according to the present invention is compressed and deformed.
Figure 3:
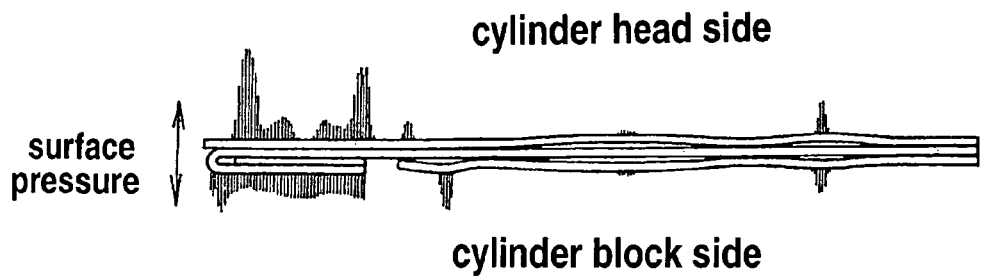
FIG. 3 is another graph showing a result of an experiment (simulation) in a surface pressure distribution generated in a case that a comparative example gasket (a=b) is compressed and deformed.
Figure 4:
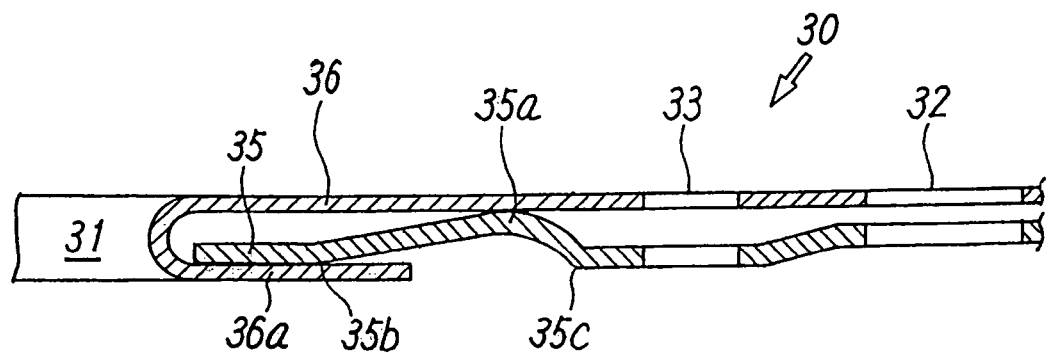
FIG. 4 is a longitudinal sectional view of an enlarged substantial part of a conventional metal laminate type cylinder head gasket.

The graph in FIG. 2 shows a result of the surface pressure with respect to a cylinder head gasket having the asymmetrical bead 14 according to the present invention shown in FIG. 1. The bead 14 has a width of 1.7 mm, and includes the bead portion 14b having a width a at the side of the combustion chamber 16 from the top of the bead 14a and the bead portion 14c having a width b at the other side from the top of the bead 14a. The ratio of a:b is set to be 6:4. The smallest radius of curvature R of the asymmetrical bead 14 is set to be 0.5 mm. The result is obtained from an analysis experiment (simulation) in the surface pressure generated when folded by compressing of the bead. On the other hand, for comparison, the graph in FIG. 3 shows another result of the surface pressure with respect to a gasket having a symmetric bead having a width of 1.7 mm instead of the asymmetrical bead. The result is obtained from an analysis experiment (simulation) in the surface pressure in the same condition described above.

As shown in the graph of FIG. 3 as a comparative example, in the case that the symmetric bead is used, generally, the surface pressure generated on the bottom portion of the bead at the side of the combustion chamber hole becomes larger than the surface pressure generated on the bottom portion of the bead at the other side due to the bent portion 12b. The surface pressures on the both bottom portions of the bead according to the embodiment of the present invention shown in FIG. 2 are almost equalized. Thus, according to the cylinder head gasket of the present invention, by forming the asymmetrical bead provided around the combustion chamber hole to be within a range of a predetermined forming condition, it is possible to balance the surface pressures generated on the both bottom portions, thereby obtaining a stable sealing capability.

In addition, it is possible to equalize the surface pressures generated on the both bottom portions of the bead as described above. In case of a cylinder block 22 attached with a cylinder liner, it is also possible to reduce the surface pressure which is applied to the cylinder liner, thereby reducing a line skew of the cylinder liner.

The disclosure of Japanese Patent Application No. 2007-001173 filed on Jan. 9, 2007 is incorporated as a reference.

While the invention has been explained with reference to the specific embodiments of the invention, the explanation is illustrative and the invention is limited only by the appended claims.

What is claimed is:

1. A metal laminate cylinder head gasket comprising:
   a first metal plate having a combustion hole, and an asymmetrical bead formed around the combustion hole, said asymmetrical bead having a large radius portion with a width (a) at a side of the combustion hole from a top of the bead, a small radius portion with a width (b) at the other side from the top of the bead, and a smallest radius (R),
   a second metal plate laminated at a projecting side of the asymmetrical bead, said second metal plate having a base portion extending parallel to the first metal plate, and a folded portion turned backwardly and laminated with the base portion, said folded portion being located under the asymmetrical bead, and
   a third metal plate laminated under the base portion of the second metal plate outside the folded portion relative to the combustion hole, said third metal plate having a bead adjacent to the folded portion,
   wherein a relationship between (a) and (b) is (a)>(b),
   the smallest radius (R) is (R)≧0.5 mm, and
   a relationship between the width (a) and the radius (R) is (a)≧2 (R).

2. A metal laminate cylinder head gasket according to claim 1, further comprising a shim situated between the folded portion and the base portion.

* * * * *